United States Patent [19]
Ma

[11] Patent Number: 5,623,392
[45] Date of Patent: Apr. 22, 1997

[54] LCD ASSEMBLY WITH PROJECTION FUNCTION

[76] Inventor: Hsi-Kuang Ma, 4F, No. 48, Sec. 2, Chung Cherng Rd., Taipei, Taiwan

[21] Appl. No.: 658,209

[22] Filed: Jun. 4, 1996

[51] Int. Cl.⁶ .............................. G06F 1/16; H05K 7/10
[52] U.S. Cl. .......................... 361/681; 345/905; 361/683; 349/58
[58] Field of Search ...................... 361/681, 682, 361/683, 724; 364/708.1; 248/917–923; 345/905, 156, 169; 312/223.1, 223.5; 359/80, 81, 83

[56] References Cited

U.S. PATENT DOCUMENTS

| | | | |
|---|---|---|---|
| 5,233,502 | 8/1993 | Beatty et al. | 361/729 |
| 5,257,164 | 10/1993 | Perez et al. | 361/681 |
| 5,327,322 | 7/1994 | Ma | 361/681 |
| 5,347,630 | 9/1994 | Ishizawa et al. | 395/164 |
| 5,450,221 | 9/1995 | Owen et al. | 359/83 |

*Primary Examiner*—Leo P. Picard
*Assistant Examiner*—Lynn D. Feild
*Attorney, Agent, or Firm*—Bacon & Thomas

[57] ABSTRACT

A LCD assembly including a LCD stand having a base and a holder frame pivoted to the base, the holder frame having a light guide board; and a LCD adapted for mounting in the holder frame of the LCD stand, the LCD including a display screen unit, and a frame shell, the display screen unit including a liquid crystal display screen at the center, a lamp tube along one long side thereof adapted for providing back light to the liquid crystal display screen, a plurality of air vents at an opposite long side thereof, at least one fan on the inside adjacent to the air vents, and a circuit board along one short side thereof, the circuit board having a switch connected to the lamp tube and the at least one fan by electric wires for controlling their operation alternatively, and a connector adapted for connecting to a computer by a cable, the frame shell having a center opening corresponding to the liquid crystal display screen, and a peripheral flange adapted for covering over the lamp tube, the at least one fan, and the circuit board when the LCD assembly is used with a projector.

3 Claims, 2 Drawing Sheets

LCD ASSEMBLY WITH PROJECTION FUNCTION

BACKGROUND OF THE INVENTION

The present invention relates to LCD assemblies, and relates more particularly to such a LCD assembly which can be used with a projector for data projection.

The manufacturing cost of a LCD is much higher than that of a CRT (cathode ray tube) display. Therefore, LCD cannot replace CRT in all cases. However, LCD can still be greatly promoted if it is added with additional functions.

SUMMARY OF THE INVENTION

The present invention has been accomplished under the circumstances in view. It is the main object of the present invention to provide a LCD assembly which can be used with a projector for the projection of image data from a computer. According to the present invention, the LCD assembly comprises a LCD stand having a base and a holder frame pivoted to the base, the holder frame having a light guide board; and a LCD adapted for mounting in the holder frame of the LCD stand, the LCD comprising a display screen unit, and a frame shell, the display screen unit comprising a liquid crystal display screen at the center, a lamp tube along one long side thereof adapted for providing back light to the liquid crystal display screen, a plurality of air vents at an opposite long side thereof, at least one fan on the inside adjacent to the air vents, and a circuit board along one short side thereof, the circuit board having a switch connected to the lamp tube and the at least one fan by electric wires for controlling their operation alternatively, and a connector adapted for connecting to a computer by a cable, the frame shell having a center opening corresponding to the liquid crystal display screen, and a peripheral flange adapted for covering over the lamp tube, the at least one fan, and the circuit board.

DETAILED DESCRIPTION OF THE PREFERRED EMBODIMENT

Figure 1:
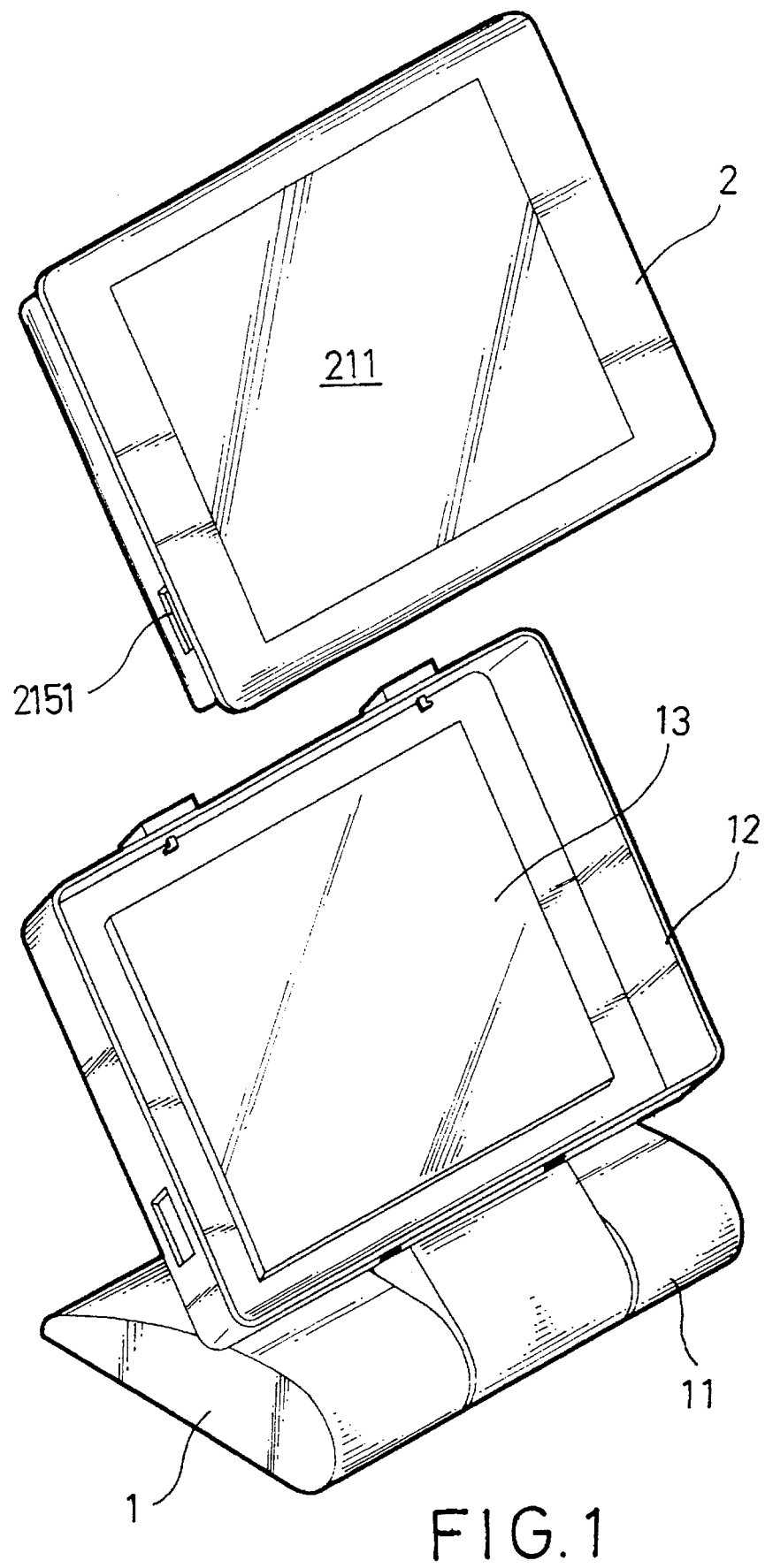
FIG. 1 is an exploded view of a LCD assembly according to the present invention.

Referring to FIG. 1, a LCD (liquid crystal display) assembly in accordance with the present invention is generally comprised of a LCD stand 1, and a LCD 2.

Referring to FIG. 1 again, the LCD stand 1 comprises a base 11, and a holder frame 12 pivotably connected to the base 11 at the top and adapted for holding the LCD 2. The holder frame 12 and can be adjusted to the desired angle, having a light guide board 13.

Figure 2:
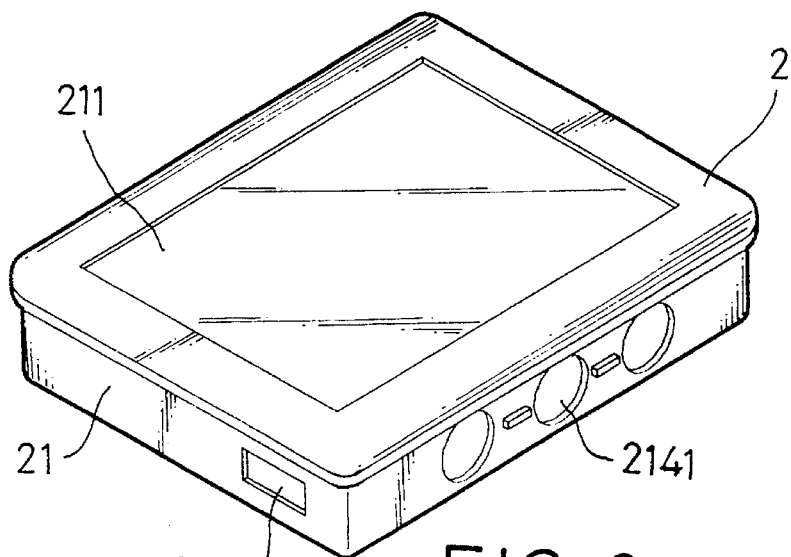
FIG. 2 is an elevational view of the LCD of the LCD assembly shown in FIG. 1.
Figure 3:
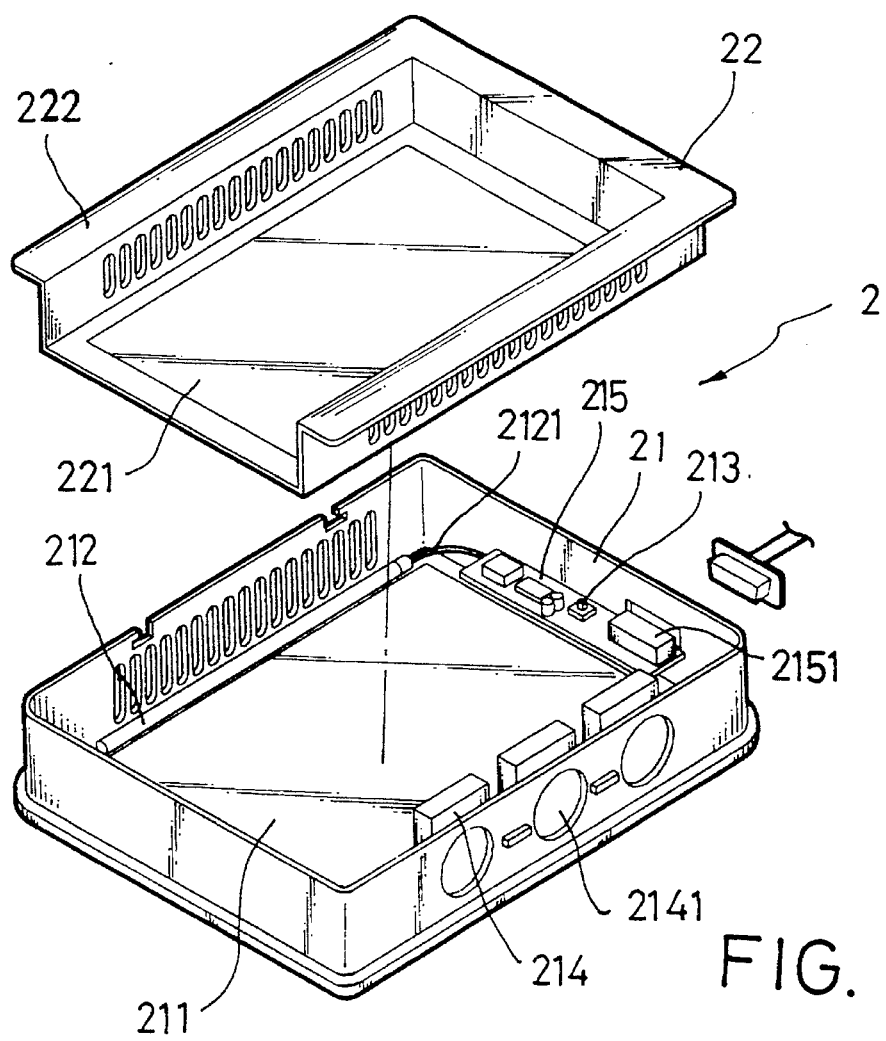
FIG. 3 is an exploded view of the LCD shown in FIG. 2.

Referring to FIGS. 2 and 3, the LCD 2 is comprised of a display screen unit 21, and a frame shell 22. The display screen unit 21 comprises a liquid crystal display screen 211 at the center, a lamp tube 212 along one long side thereof, a plurality of air vents 241 at an opposite long side thereof, at least one fan 214 on the inside adjacent to the air vents 241, a circuit board 215 along one short side thereof. The circuit board 215 comprises a switch 213, and a connector 2151 adapted for connecting to a computer by a cable. The lamp tube 212 and the at least one fan 214 are respectively connected to the switch 213 of the circuit board 215 by electric wire 2121, 2142. The frame shell 22 fits the display screen unit 21, having a center opening 221 corresponding to the liquid crystal display screen 211, and a peripheral flange 222 covered over the lamp tube 212, fan 214, and circuit board 215 of the display screen unit 21.

Referring to FIGS. 1, 2, and 3 again, when the LCD 2 is put in the holder frame 12 of the LCD stand 1, the switch 213 is controlled to switch on the lamp tube 212. When the lamp tube 212 is turned on, the light of the lamp tube 212 is reflected onto the liquid crystal display screen 211, so that the image in the liquid crystal display screen 211 can be seen. When the LCD 2 is removed from the holder frame 12 of the LCD stand 1, it can be put in a projector for the projection of an image. When the LCD 2 is put in a projector, the switch 213 is controlled to switch off the lamp tube 212 and to switch on the fan 214, and the graphic data received from the computer through the connector 2151 is shown through the liquid crystal display screen 211 and projected onto a screen by the projector.

While only one embodiment of the present invention has been shown and described, it will be understood that various modifications and changes could be made thereunto without departing from the spirit and scope of the invention disclosed.

What the invention claimed is:

1. A LCD assembly comprising:

a LCD stand having a base and a holder frame pivoted to said base, said holder frame having a light guide board;

a LCD adapted for mounting in the holder frame of said LCD stand, said LCD comprising a display screen unit, said display screen unit comprising a liquid crystal display screen at the center, a lamp tube along one long side thereof adapted for providing back light to said liquid crystal display screen, a plurality of air vents at an opposite long side thereof, at least one fan on the inside adjacent to said air vents, and a circuit board along one short side thereof, said circuit board comprising a switch connected to said lamp tube and said at least one fan by electric wires for controlling their operation alternatively, and a connector adapted for connecting to a computer by a cable.

2. The LCD assembly of claim 1 wherein said LCD further comprises a frame shell fitting said display screen unit, having a center opening corresponding to said liquid crystal display screen, and a peripheral flange adapted for covering over said lamp tube, said at least one fan, and said circuit board.

3. A LCD assembly comprising:

a LCD stand having a base and a holder frame pivoted to said base, said holder frame having a light guide board and a lamp tube at one side controlled to provide a back light to a LCD mounted in said holder frame;

a LCD adapted for mounting in the holder frame of said LCD stand, said LCD comprising a display screen unit, said display screen unit comprising a liquid crystal display screen at the center, a plurality of air vents at an opposite long side thereof, at least one fan on the inside adjacent to said air vents, and a circuit board along one short side thereof, said circuit board comprising a switch connected to said at least one fan by electric wires for controlling its operation, and a connector adapted for connecting to a computer by a cable.

* * * * *